Patented Oct. 9, 1945

UNITED STATES PATENT OFFICE 2,386,452

ORGANO SILICON COMPOUNDS AND METHOD OF MAKING THEM

Robert F. Fleming, Jr., Laurens, S. C., assignor to Corning Glass Works, Corning, N. Y., a corporation of New York No Drawing. Application September 25, 1942, Serial No. 459,738

10 Claims. (Cl. 260—462)

This invention relates to organo-silicon compounds and methods of preparing them.

One of the objects of my invention is to provide a new method of preparing organo-silicon compounds of the type $X_{4-n}SiY_n$, where X may be the same or different organic radicals; Y represents a member of the group consisting of halogens and alkoxy radicals; and where n equals 0, 1, 2, or 3.

Another object of my invention is to employ organo-lithium compounds for introducing organic radicals into silicon compounds.

Still another object of my invention is to prepare new compositions of matter by means of the interaction of organo-lithium compounds and silicon compounds.

A further object of my invention is to prepare aminoaryl and substituted aminoaryl silicon compounds.

In accordance with my invention I have provided a new method of introducing organic radicals into silicon compounds having halogens or alkoxy radicals attached directly to the silicon. This method comprises in general reacting organo-lithium compounds of the type RLi, where R is an organic radical, with compounds of the type $X_{4-n}SiY_n$, where X is an organic radical; Y represents a member of the group consisting of halogens and alkoxy radicals; and n represents an integer from 1 to 4 in accordance with the following equation $$RLi + X_{4-n}SiY_n \rightarrow RX_{4-n}SiY_{n-1} + LiY$$

In general the product resulting from this reaction comprises a mixture of the various possible R substituted silicon compounds and not the single one indicated in the equation. In carrying out the reaction, the RLi compound is dissolved or suspended in any suitable organic solvent such as diethyl ether and is then added slowly to an ice cold solution of the silicon compound in the same organic solvent. The solution is stirred during the reaction and protected against oxygen and moisture in order to enhance the yield. The LiY compounds being insoluble in the organic solvent readily settle out and may be removed by filtration. The remaining products are then separated by fractional distillation.

If desired, the above procedure may be modified in the following manner. Instead of first preparing the RLi compound by reacting lithium with the corresponding organic halide, the latter is added slowly with vigorous stirring to a mixture of Li and the silicon compound in an inert solvent such as diethyl ether. The temperature is maintained between 35°–40° C. during the addition of the halide and for some time thereafter. Oxygen and moisture are preferably excluded. It was found that when silicon halides or substituted silicon halides are used that the first procedure gives better results for the reason that the presence of silicon halides or substituted silicon halides interferes with the formation of the RLi compound and the Li present promotes condensation of the substituted silicon halides to give Si—Si linkages thereby reducing the yield of the desired product. With the alkoxy silicon compounds this complication does not occur so the organic halide can be added directly to a mixture of Li and a silicon alkoxide in some inert solvent with good yields of the desired product.

The choice of solvent depends upon the particular organic halide to be used. Generally speaking diethyl ether gives better yields of organo-silicon compounds, although in some cases either benzene or low boiling petroleum ether, alone or mixed with diethyl ether can be used to advantage.

For a better understanding of my invention the following examples are given. In the examples abbreviations are used to designate certain elements and groups, thus: methyl (Me); ethyl (Et); phenyl (φ).

*Example 1*

Methyllithium was prepared by reacting lithium and MeCl in diethyl ether. The ether solution of MeLi was then added slowly with stirring to an ice-cold solution of 6.5 g. of $SiCl_4$ in 50 cc. of ether. During the entire procedure the reactants were protected from moisture and oxygen. Most of the ether was removed by distillation and the residue was treated with dry $C_2H_5OH$ to form the silicon esters. The mixture was then hydrolyzed by the addition of water and alkali. An oily product was isolated from this reaction mixture which was a copolymer containing dimethyl-silicon and mono-methyl silicon structural units.

*Example 2*

A solution of 0.79 mole of φLi in ether was prepared in the usual manner from φBr and Li. The φLi was then added slowly with stirring to an ice-cold solution of 4 moles of $SiCl_4$ in four volumes of ether. After filtering, the ether was removed and the resulting liquid was distilled at 18 mm. yielding 39 g. of $φ_2CiCl_2$ B. P. 175°–185° C., and 30 g. of a mixture of liquid $φ_2SiCl_2$ and solid $φ_3SiCl$ having a boiling range of 200°–280° C.

*Example 3*

An ether solution of EtLi was run slowly into a solution of 1 mole of $φSiCl_3$ in four volumes of ether. The reaction was allowed to proceed at the boiling point of ether. The solution was filtered; the solvent was removed; and the resulting liquid was fractionated at atmospheric pressures to give $φEtSiCl_2$ having a boiling range of about 225°–235° C. at 760 mm.

Example 4

To .4 mole of Li in 70 cc. of benzene, .2 mole of undiluted φCl was added slowly. The mixture was stirred and warmed for three days. It was then run into 35 g. of SiCl₄ which was dissolved in an equal volume of ether. The solution was filtered and fractionally distilled. This gave φSiCl₃ having a boiling range of 195°–200° C.

Example 5

A solution of .061 mole of φLi in 100 cc. of ether was added slowly with stirring to .2 mole of SiCl₄ diluted with 100 cc. of ether. The reaction mixture was cooled in an ice bath. Filtration and fractional distillation gave φSiCl₃ having a boiling range of 195°–200° C. at 760 mm.

Example 6

The above experiment was repeated except that a mixture of equal parts of ether and benzene was used as a solvent for the preparation of φLi from φCl and Li. In this case φSiCl₃ having a boiling range of 195°–200° C. at 760 mm. was isolated.

Example 7

Ethyllithium was prepared by reacting EtCl and Li in ether. The resulting solution was shown by titration to contain .082 mole of the product. It was then added slowly with stirring to a cold solution containing 17.6 g. of φSiCl₃ in 75 cc. of ether. The mixture was filtered and fractionated. In this way a liquid having a boiling range of 90°–110° C. at 30 mm. was obtained. A sample was analyzed for chlorine and found to contain 38%. This corresponds to a mixture of 75% φEtSiCl₂ and 25% φSiCl₃.

Example 8

A solution of .079 mole of EtLi in ether was prepared in the usual manner and added slowly with stirring to .2 moles of SiCl₄ dissolved in 75 cc. of ether. The reaction mixture was cooled with ice. When the mixture was filtered and fractionated, EtSiCl₃ having a boiling point of 100° C. at 760 mm. and Et₂SiCl₂ having a boiling point of 130° C. at 760 mm. were isolated.

Example 9

1.4 grams of Li, 23 cc. SiCl₄ and 50 cc. of either were placed in a three-neck flask and 12.6 g. of undiluted benzyl chloride were added slowly. During the reaction the mixture was stirred and warmed so that the ether refluxed. The heating was continued overnight. The mixture was filtered and fractionally distilled. This gave φCH₂SiCl₃.

Example 10

It is known that p-bromoanisole reacts with Li to give a mixture of 3 bromo-, 6-methoxyphenyllithium and 4-methoxyphenyllithium according to the following equations.

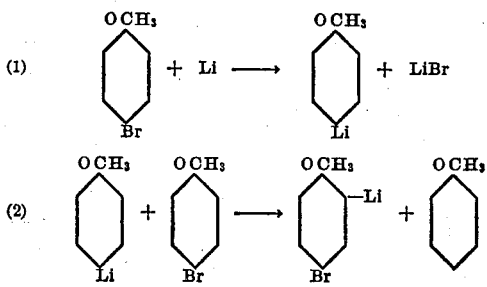

The second reaction predominates.

To 1.4 g. of Li in 50 cc. of ether a solution of 18.7 g. of p-bromoanisole in 40 cc. of ether was added slowly with stirring. The stirring was continued overnight. A dark brown solution with only a small amount of precipitate was obtained. This solution was then added to an ice cold solution of 23 cc. of SiCl₄ in 70 cc. of ether. A considerable amount of LiCl separated. The mixture was filtered and fractionated. After removal of the ether, anisole and unreacted p-bromoanisole, a dark brown liquid having a boiling range of 120°–200° C. at 13 mm. was obtained. This was redistilled and the sample having a boiling range of 130°–140° C. was taken for analysis. Qualitative tests showed the presence of bromine. Analysis for silicon in terms of SiO₂ gave 19.2% SiO₂; silica calculated for

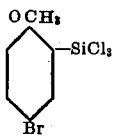

is 18.7%.

Example 11

To a mixture of 14 g. of Li, .2 mole of Si(OEt)₄ and 44 cc. of ether, 11.2 g. of φCl was added slowly with stirring. After all the φCl had been added the stirring was continued overnight. The mixture was filtered and the ether was removed at atmospheric pressure. The residue was then fractionated at 15 mm. A colorless liquid having a boiling point of 120 C. at 15 mm. was obtained. Analysis showed 25.1% SiO₂; calculated silica for φSi(OEt)₃ is 25%.

Example 12

MeSi(OEt)₃ (.2 mole) was diluted with an equal volume of ether and 1.4 g. of Li was added. The mixture was stirred and warmed as 11.2 g. of φCl were dropped in. After three hours, the reaction was complete. The mixture was filtered and fractionated to give a colorless liquid having a boiling range of 105°–110° C. at 13 mm. Analysis showed 28.8% SiO₂. Theoretical SiO₂ for φMeSi(OEt)₂ is 28.6%.

Example 13

A mixture of 1.4 g. of Li, 30 cc. of Si(OEt)₄, and 20 cc. of ether was placed in a three-neck flask. The stirrer was started and 20 g. of p-bromodimethylaniline in 50 cc. of ether was added at such a rate that the ether refluxed gently. When the mixture was filtered and fractionated, a light yellow liquid having a boiling range of 180°–182° C. at 14 mm. was isolated. Analysis showed 21.2% SiO₂. Theoretical SiO₂ for Me₂NC₆H₄Si(OEt)₃ is 20.9%.

Example 14

To a mixture of 1.4 g. of Li, 30 cc. of Si(OEt)₄, and 20 cc. of ether a solution of 17.1 g. of p-CH₃C₆H₄Br in 40 cc. of ether was added slowly with stirring. The mixture was warmed during the reaction. Filtration and fractionation resulted in the separation of a colorless liquid which boiled at 137° C. at 14 mm. Analysis showed 23.8% SiO₂. Theoretical SiO₂ for CH₃C₆H₄Si(OEt)₃ is 23.6%.

Example 15

Lithium (1.4 g.) was placed in a solution of 30 cc. of Si(OEt)₄ in 20 cc. of ether and the mixture was stirred and warmed as 18.5 g. of 2-bromo, 1,4-dimethylbenzene in 30 cc. of ether were slowly added. The mixture was filtered and fractionally distilled. A colorless liquid boiling at 150° C. at 23 mm. was isolated. Analysis showed 22.8% SiO₂; theoretical SiO₂ for $$(CH_3)_2C_6H_3Si(OEt)_3$$

is 22.4%.

Example 16

To a mixture of 1.4 g. of Li, 30 cc. of Si(OEt)₄, and 20 cc. of ether, a solution of 23.3 g. of p-bromodiphenyl was added slowly with stirring. After the reaction was complete the mixture was filtered and distilled. This gave a colorless liquid having a boiling range of 210°–215° C. at 13 mm. Analysis showed 18.8% SiO₂; theoretical SiO₂ for C₆H₅—C₆H₄Si(OEt)₃ is 19%.

Example 17

A solution of 17.2 g. of p-bromoaniline in 50 cc. of ether was added with stirring to a mixture of 1.4 g. Li, 45 cc. of Si(OEt)₄, and 20 cc. of Et₂O. The reactants were maintained at 35° for seven hours. Filtration and distillation resulted in the isolation of a brown liquid having a boiling range of 145°–150° C. at 14 mm. This material reacted vigorously with acetyl chloride to give a white crystalline product. Analysis showed 22.4% SiO₂; theoretical SiO₂ for $$H_2NC_6H_4Si(OEt)_3$$

is 23.6%.

Example 18

A solution of .094 mole of p-dimethylaminophenyllithium was prepared by reacting 1.4 g. of Li with 20 g. of p-bromodimethylaniline in ether. The solution was then slowly added with stirring to 0.028 mole of Si(EtO)₄ in 25 cc. of ether and the mixture was refluxed overnight. The ether and low boiling fractions were removed and a yellow viscous oil boiling about 300° C. remained. This was treated with aqueous alcohol and after removal of the water and alcohol a yellow crystalline material remained. The silicol was distilled and was found to boil at 275°–280° C. at 12 mm. Analysis showed 14.65% SiO₂; calculated SiO₂ for [(CH₃)₂NC₆H₄]₃SiOH is 14.8%.

Example 19

Amyllithium was prepared by reacting n-amyl chloride with Li in ether. To a solution of .218 mole of amyllithium in 30 cc. of ether, .103 mole of benzyl alcohol in 100 cc. of ether was added slowly with stirring. The reaction mixture was cooled in an ice bath during the addition of the alcohol. The mixture was refluxed for 20 hours and then run into a solution of .2 mole of Si(OEt)₄ in 50 cc. of ether. After 3 hours heating, the solution was cooled with ice and dry HCl was passed through to remove the Li alcoholates. The solution was filtered, the ether was removed, and the residue was fractionated. A yellow viscous oil boiling 200°–210° C. at 15 mm. was isolated. Analysis showed 17.8% SiO₂; calculated SiO₂ for (HOCH₂C₆H₄)₂Si(OEt)₂ is 18.1%.

By the above method I have been able to prepare compounds which were hitherto only difficultly prepared by means of the magnesium Grignard reaction and in some cases impossible to prepare. My method also has the advantage of being carried out at low temperatures because of the reactivity of the lithium compounds. Furthermore, since the lithium salts do not form etherates with ether, the reaction proceeds with celerity and in a clean-cut fashion owing to the absence of bulky etherates which normally interfere with the progress of the magnesium Grignard reaction.

By my method alkyl groups such as methyl, ethyl, propyl, iso-propyl, butyl, iso-butyl, ter-butyl, amyl, etc.; substituted alkyl such as benzyl; aryl groups such as phenyl, naphthyl, anthracyl, tolyl, xylyl, biphenyl, etc.; or substituted aryl groups such as anisyl, aminophenyl; dialkylaminophenyl, dihydroxyphenyl, w-hydroxytolyl, etc. may be introduced into silicon compounds having one or more halogen atoms or alkoxy groups attached directly to the silicon. On the strength of the evidence provided by the examples given above it is believed that any organic radical capable of forming an organo-lithium compound with lithium may be introduced into silicon compounds having one or more halogen atoms or alkoxy groups attached directly to the silicon by means of the above described methods.

The organo-silicon compounds prepared by my new method as illustrated in the above examples are extremely useful as intermediates in the production of organo-silicones. The latter are polymerizable substances having a wide variety of uses in the fields of coating compositions, tape impregnants, oils, dielectrics, electrical insulation, etc.

I claim:

1. A compound having the structural formula

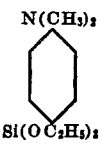

2. A compound having the structural formula

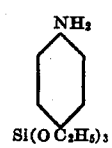

3. The method of preparing a compound having the formula (CH₃)₂NC₆H₄Si(OC₂H₅)₃ which comprises reacting together lithium, ethyl silicate and p-bromodimethylaniline, heating the reaction mixture, and fractionally distilling the liquid portion of the reaction product to recover the liquid boiling between 180°–182° C. at 14 mm. of Hg.

4. The method of preparing a compound having the formula H₂NC₆H₄Si(OC₂H₅)₃ which comprises reacting together lithium, ethyl silicate and p-bromoaniline, heating the reaction mixture, and fractionally distilling the liquid portion of the reaction product to recover the liquid boiling between 145°–150° C. at 14 mm. of Hg.

5. The method of preparing organo-monosilanes which comprises reacting lithium and an organic halide whose organic substituent is selected from the class consisting of amino-aryl and N-alkyl-amino-aryl radicals with ethyl orthosilicate.

6. The method which comprises reacting ethyl orthosilicate with lithium and an amino-aryl halide.

7. The method which comprises reacting ethyl orthosilicate with lithium and an N-alkyl-amino-aryl halide.

8. A compound having the general formula RSi(O-Alkyl)$_3$, where R represents an organic radical which is selected from the class consisting of amino-aryl and N-alkyl-amino-aryl radicals and which is attached to silicon through carbon-silicon linkage.

9. A compound having the general formula RSi(O-C$_2$H$_5$)$_3$, where R represents an organic radical which is selected from the class consisting of amino-aryl and N-alkyl-amino-aryl radicals and which is attached to silicon through carbon-silicon linkage.

10. The method which comprises reacting an organo-lithium compound whose organic substituent is selected from the class consisting of amino-aryl and N-alkyl-amino-aryl radicals with ethyl orthosilicate.

ROBERT F. FLEMING, Jr.